UNITED STATES PATENT OFFICE.

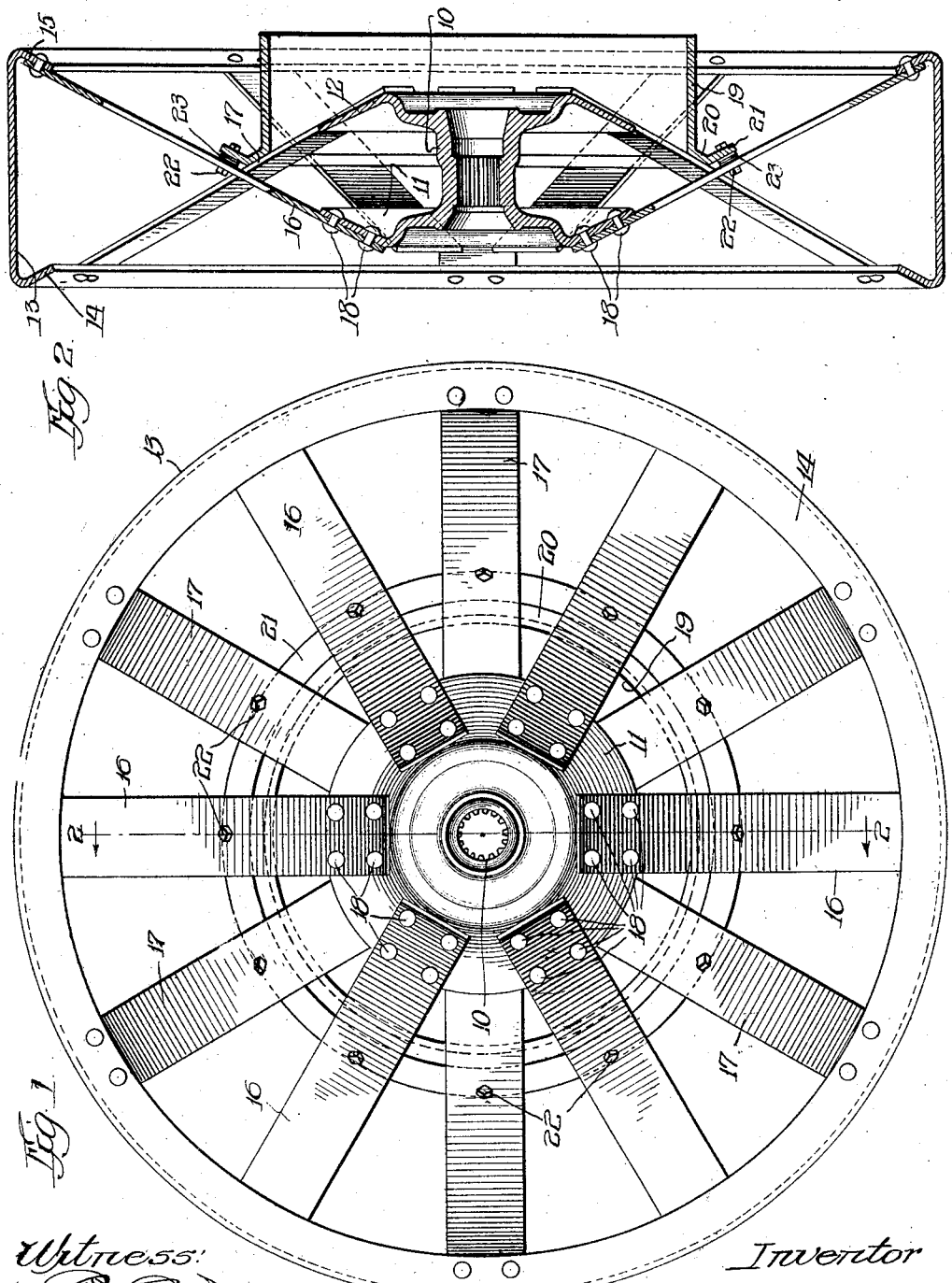

JOHN RIISE, OF DOYLESTOWN, OHIO.

WHEEL CONSTRUCTION.

1,355,505.  Specification of Letters Patent.  Patented Oct. 12, 1920.

Application filed July 3, 1919. Serial No. 308,507.

*To all whom it may concern:*

Be it known that I, JOHN RIISE, a subject of the King of Norway, residing at Doylestown, in the county of Wayne and State of Ohio, have invented certain new and useful Improvements in Wheel Constructions, of which the following is a specification.

This invention relates to wheel constructions, and more particularly to tractor wheel constructions.

Tractor wheels are subjected to unusually hard treatment under service conditions. Not only do they carry the weight of the tractor, but they must encounter all of the irregularities of the ground over which they pass. When the ground or roads are rough and rocky, the abuse the tractor must take is enormous, it being borne in mind that the weight of the tractor is behind all of the blows on the wheels. Tractor wheels accordingly must be strongly constructed and, at the same time, must be relatively light to minimize the total weight of the tractor.

Therefore, one object of my invention is to simplify and improve the construction of tractor wheels, making the same durable, as well as light.

Another object is to provide a simple and novel tractor wheel and means whereby a brake flange may be effectively supported by the spokes of the wheel.

These and other objects are accomplished by means of the construction as shown on the accompanying sheet of drawings, in which—

Figure 1 is a side elevation of my tractor wheel; and

Fig. 2 is a sectional view of the same, taken in the plane of line 2—2 of Fig. 1.

Referring to the figures of the drawings, it will be noted that the wheel includes a hub 10 having integrally formed flanges 11 and 12, which converge radially outwardly. The wheel also includes a rim 13 having integrally formed flanges 14 and 15, which converge radially inwardly. One set of spokes 16 connects the hub outer flange 11 with the rim inner flange 15, and another set of spokes 17 connects the hub inner flange 12 with the rim outer flange 14, these spokes in each set being arranged alternately with respect to the spokes in the other set and in planes which intersect intermediate the hub and rim.

All of the spokes preferably are of flat plate-metal, and it will be noted that in view of the fact that the hub flange 12 and the rim flange 14 are inclined at about the same angle, and that the hub flange 11 and the rim flange 15 also are inclined substantially at the same angle, the spokes are straight throughout their length.

In the ordinary practice of wheel construction, the spokes are under considerable tension under operating conditions, due to the side thrust on the wheels. To eliminate the maximum amount of such tension due to side thrusts on the wheels, the spokes in my wheel are alternately arranged, one set connecting the hub inner flange 12 with the rim outer flange 14, and the other set connecting the hub outer flange 11 with the rim inner flange 15. These spokes preferably are secured on the outer surface of the hub flanges 11 and 12 and on the inner surfaces of the rim flanges 14 and 15, the connections of the spokes to said parts being made preferably by rivets 18, which rivets are in shear instead of in tension or a combination of both.

This wheel carries a brake flange 19, one edge of which terminates in angular portions 20 and 21 respectively, the portion 20 being parallel with the spokes 17, and the other angular portion 21 being parallel with the spokes 16. The brake flange 19 is connected to the spokes 16 and 17 by bolts and nuts 22, suitable spacers 23 being provided between the angular flange portion 20 and the spokes 17. This brake flange 19 preferably is connected to the spokes adjacent the point of intersection of their planes. By means of this arrangement, the brake flange 19 may readily be applied to or disconnected from the spokes of the wheel.

The wheel construction as a whole is simple, light and durable, and adapted to meet all of the requirements under service conditions.

It is my intention to cover all modifications of the invention falling within the spirit and scope of the appended claims.

I claim:

1. A vehicle wheel comprising a hub having inner and outer flanges converging radially outwardly, a rim having inner and outer flanges converging radially inwardly, whereby the hub inner flange is substantially in the same plane with the rim outer flange, and the hub outer flange is substantially in the same plane as the rim inner flange, and straight spokes, some of which connect the hub outer flange with the rim inner flange and others of which connect the hub inner flange with the rim outer flange.

2. A vehicle wheel comprising a hub having flanges converging radially outwardly, a rim having flanges converging radially inwardly, spokes lying in intersecting planes connecting oppositely arranged flanges of said hub and rim, and a brake flange secured to said spokes adjacent their plane of intersection.

3. A vehicle wheel comprising a hub having flanges converging radially outwardly, a rim having flanges converging radially inwardly, inclined spokes connecting oppositely arranged flanges on said hub and rim, and a brake flange having inclined portions corresponding to the inclination of the spokes and being secured to the latter.

4. A vehicle wheel comprising a hub, a rim, spokes inclined in opposite directions and intersecting in a plane within the wheel body connecting different portions of the hub and rim, and a brake flange connected to said spokes adjacent their point of intersection.

Signed at Chicago, Illinois, this 26th day of June, 1919.

JOHN RIISE.